US008964557B2

(12) United States Patent
Tong et al.

(10) Patent No.: US 8,964,557 B2
(45) Date of Patent: Feb. 24, 2015

(54) DATA FLOW CONTROL

(75) Inventors: Fei Tong, Meldreth (GB); Andrei Popescu, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 104 days.

(21) Appl. No.: 13/547,348

(22) Filed: Jul. 12, 2012

(65) Prior Publication Data

US 2013/0028092 A1 Jan. 31, 2013

(30) Foreign Application Priority Data

Jul. 25, 2011 (GB) .................................. 1112734.7

(51) Int. Cl.
*H04W 28/12* (2009.01)
*H04L 12/825* (2013.01)
*H04L 12/835* (2013.01)
*H04W 28/02* (2009.01)
*H04W 28/22* (2009.01)
*H04W 84/12* (2009.01)
*H04W 88/08* (2009.01)

(52) U.S. Cl.
CPC .............. *H04L 47/26* (2013.01); *H04L 47/30* (2013.01); *H04W 28/02* (2013.01); *H04W 28/22* (2013.01); *H04W 84/12* (2013.01); *H04W 88/08* (2013.01)
USPC ........................................................ 370/235

(58) Field of Classification Search
CPC ...................................................... H04W 28/02
See application file for complete search history.

(56) References Cited

U.S. PATENT DOCUMENTS

| 2005/0201361 | A1  | 9/2005 | Morioka et al. |
| 2008/0253284 | A1  | 10/2008 | Montalvo et al. |
| 2012/0052901 | A1* | 3/2012 | Zhu et al. ........................ 455/517 |
| 2012/0064909 | A1* | 3/2012 | Lindoff et al. .............. 455/452.2 |
| 2013/0028088 | A1* | 1/2013 | Do et al. ........................ 370/235 |

FOREIGN PATENT DOCUMENTS

WO 2010012066 A1 2/2010

OTHER PUBLICATIONS

Search Report from corresponding United Kingdom application GB1112734.7, dated Nov. 1, 2012.

* cited by examiner

*Primary Examiner* — Huy D Vu
*Assistant Examiner* — Teisha D Hall
(74) *Attorney, Agent, or Firm* — Vorys, Sater, Seymour and Pease LLP; Vincent M DeLuca

(57) ABSTRACT

A communication device capable of receiving data from a transmitting device via a communications link, the communication device comprising a buffer and being capable of generating, in dependence on the capacity of the buffer to accommodate data received over the communications link, information for inducing the transmitting device to change its data transmission rate, wherein the information imitates a change in a capability of the communication device to receive data via the communications link.

15 Claims, 7 Drawing Sheets

DATA FLOW CONTROL

The present invention relates to devices, methods and computer programs for controlling the rate of transmitted data.

The evolution of IEEE 802.11 (also known as "Wi-Fi") standards provides the physical layer (PHY) with ever-increasing throughput. For instance, IEEE 802.11n provides a maximum throughput of 600 Mbps. Although the PHY is designed to cope with a high throughput, due to limited buffer size and processing power in the application layer in some devices (for example, in low-power mobile devices), periods of high rate incoming data can cause buffer overflows (data loss) in the radio link layer in the receiving device.

A number of factors can contribute to surges in the data rate. For example, a sudden improvement of signal strength (e.g. when a station moves to a spot with line of sight channel) and a sudden reduction in traffic (creating a 'quiet' wireless medium) to other stations in the same coverage area.

The buffer overflows and associated data loss in the link layer can cause higher layer re-transmissions, which unnecessarily reduce the spectrum/power efficiency.

There are a number of methods in the art which try to implement data flow control to address the abovementioned problem. For example, mechanisms which involve power saving techniques are provided by the IEEE 802.11 standard which can be used to implement flow control. The station undergoing buffer overflow in the incoming queue will go into sleeping mode; this will then enforce the peer to stop sending packets (transmission gating). This mechanism introduces a signalling overhead when announcing that the station is going into sleep mode or waking up. Moreover, the packet transmission gating will increase latency and reduce the data rate to an unnecessarily low level. Observing in a short period, this mechanism will artificially increase the traffic 'burstiness'.

Another prior art solution to the abovementioned problem involves dropping received frames. However, this does not necessarily solve the problem as the re-transmission can still cause buffer overflow if the data rate surge period is prolonged.

Thus there is a need for a mechanism that can help improve data flow control and provide a more efficient use of spectrum and power. Embodiments of the present invention can help provide devices, methods and computer programs for improved data flow control which, at least partially, can help overcome the abovementioned problems.

According to a first embodiment of the invention, there is provided a communication device capable of receiving data from a transmitting device via a communications link, the communication device comprising a buffer and being capable of generating, in dependence on a capacity of the buffer to accommodate data received over the communications link, information for inducing the transmitting device to change its data transmission rate, wherein the information imitates a change in a capability of the communication device to receive data via the communications link.

The information may be such as to control communication between the communication device and the transmitting device in accordance with a link layer protocol.

The communication device may be configured to operate in accordance with a radio protocol or the link layer protocol, wherein the information controls communication between the communication device and the transmitting device in accordance with the radio or link layer protocol.

In accordance with the protocol, the information may be configured for controlling quality of service or beamforming.

The information may be dependent on a modulation and/or coding capability of the communication device.

The information may be dependent on a modulation and/or coding scheme.

The change in the capability can comprise increasing or decreasing the modulation and/or coding scheme.

The information may be dependent on a performance of the communication device and/or the communications link.

The information may be dependent on a signal to noise ratio of the communications link.

The change in the capability can comprise increasing or decreasing an indication of the signal to noise ratio.

The capacity of the buffer to accommodate data received over the communications link may be dependent on one or more of: data transmission rate of the transmitting device; input data rate at the buffer; output data rate at the buffer; and available space in the buffer.

The capacity of the buffer to accommodate data received over the communications link may be determined in dependence of predicting buffer overflow or underflow.

The capacity of the buffer to accommodate data received over the communications link can be determined in dependence of comparing the data transmission rate and an output data rate to determine available buffer space.

The communication device can be configured such that: when the data transmission rate is greater than the output data rate, the information imitates a change in a capability of the communication device to induce a reduction in the data transmission rate; and when the data transmission rate is less than the output data rate, the information imitates a change in a capability of the communication device to induce an increase in the data transmission rate.

The communication device can be configured to send the information to the transmitting device.

The communications link can be wireless.

According to a second embodiment of the invention, there is provided a method of operating a receiver, the receiver comprising a buffer, the method comprising: receiving data from a transmitting device via a communications link; generating information in dependence on the capacity of the buffer to accommodate data received over the communications link, wherein the information imitates a change in a capability of the receiver to receive data via the communications link; and sending the information to the transmitting device, wherein the information induces the transmitting device to change its data transmission rate. A computer program for operating a receiver may be provided, the computer program comprising code means that, when executed by a computer, will cause the computer to carry out the steps described in the method.

For a better understanding of the present invention, reference is made by way of example to the following drawings, in which.

Figure 1:
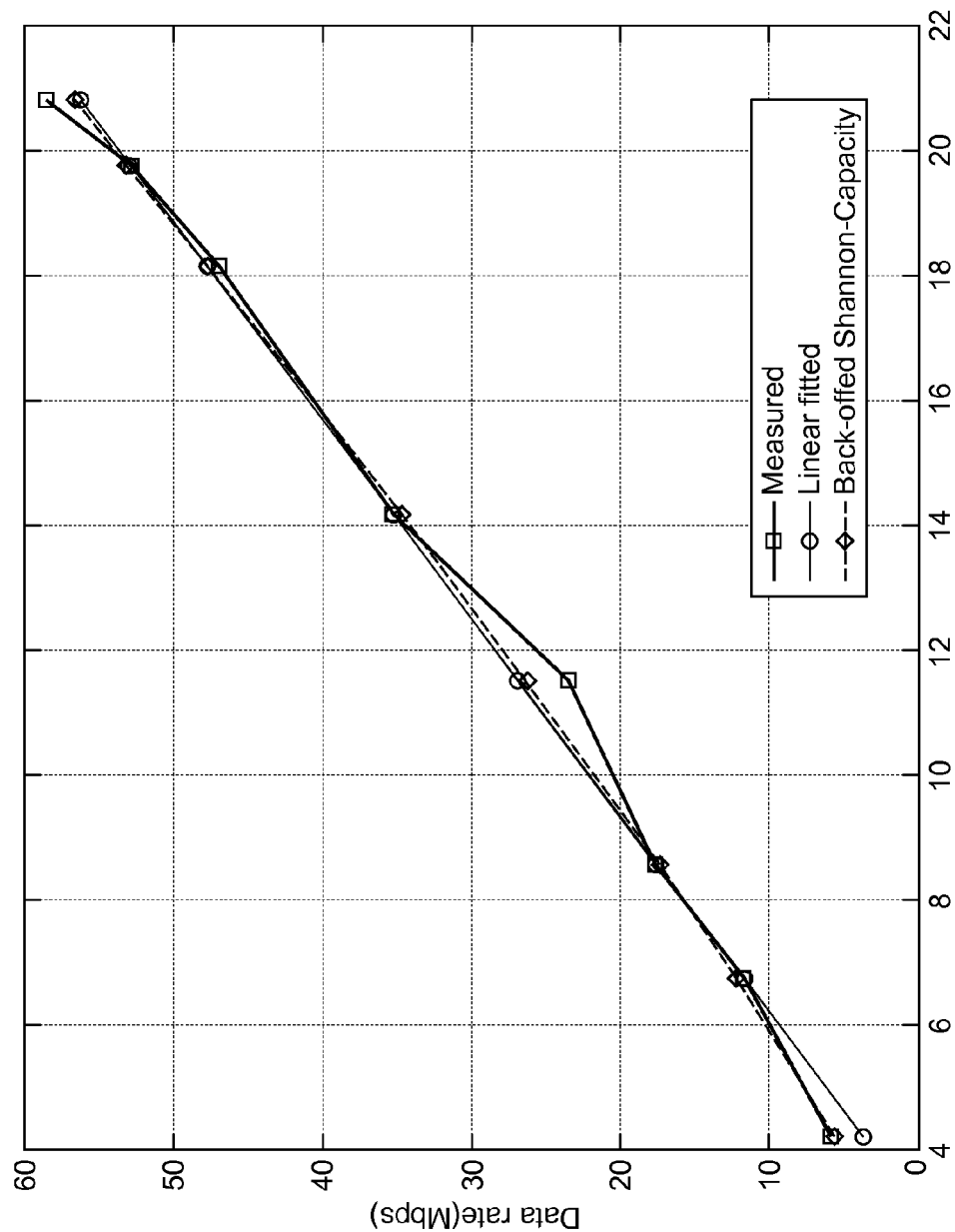
FIG. 1 shows a graph of PHY data rate verses SNR.

In the following detailed description, numerous specific details are set forth in order to provide a thorough understanding of some embodiments. However, it will be understood by persons skilled in the art that some embodiments may be practiced without these specific details. In the following, devices using the IEEE 802.11n and the IEEE 802.11ac (currently in draft) standards will be used as an example to describe some embodiments of the present invention. The invention may be implemented by other types of devices that use other methods, standards or protocols for communication.

A communication device, for example a station (STA) or access point (AP), can receive data from a transmitting device, for example an AP or STA. The devices can communicate via a communications channel or link (for example a wireless medium) provided by the PHY. In the IEEE 802.11n standard and the IEEE 802.11ac (draft), there are feedback mechanisms that can be utilised to provide a means for performing channel/link adaptation, i.e. adaptive modulation and coding (AMC). For a STA or AP responding to the feedback, there can be a correlation between link data rate and the feedback. This feedback based link adaptation can be used in a new way as a flow control mechanism. For example, when the capacity (i.e. the capability or condition) of the buffer to accommodate data received over a communications link changes, feedback sent to the transmitting device can be used to adjust the rate at which data is transmitted by the transmitting device. Thus, the rate at which data is transmitted by the transmitting device can be dependent on the capacity of the buffer. When the buffer has a lower capacity to accommodate received data, for example when a buffer overflow (which can be caused by excessive PHY data rate) condition is predicted or measured by a receiving device, feedback can be transmitted to the peer STA/AP to limit the incoming data rate.

The feedback mechanisms can be represented as information or data in parts of frames that are sent during communication between devices. By adjusting the information, which may be data values or parameters, it is possible to provide a flow control mechanism. Such information may not necessarily be associated with flow control but may instead be associated with other aspects of controlling communication between devices. However, such adjustments can be utilised to provide an efficient method of flow control. For example, information such as a SNR value that, according to a communications protocol, is used for controlling beamforming, can be utilised in a different way to implement flow control. The feedback mechanisms that could be used may be based on the performance or capability of the communications link and/or the performance or capability of the device receiving data. The information can be based on a characteristic or capacity or parameter or condition of the communication device and/or a property of the communications link.

The flow control mechanisms described herein can be implemented in devices that operate in accordance with a communications protocol, such as IEEE 802.11n. The flow control mechanisms can use features of the communications protocol (which may not be associated with flow control according to the communications protocol) to implement flow control. A receiving device which carries out one of the flow control mechanisms described herein can implement flow control on any transmitting device which operates according to the same communications protocol. The receiving device can use features of the communications protocol (e.g. features that may not be associated with flow control according to the communications protocol) to deceive or manipulate the transmitting device into implementing flow control.

One of the feedback mechanisms that can be utilised is the signal-to-noise ratio (SNR) report sub-field inside the Channel State Information (CSI) report field (defined in IEEE 802.11n-2009 7.3.1.27, and expected to remain the same in the IEEE 802.11ac standard). In the IEEE 802.11n standard, the CSI report field is used to calculate a beamforming feedback matrix for transmit beamforming. Each SNR report field (for a particular space-time stream) can be an 8 bit value, ranging from −10 dB to 53.75 dB with 0.25 dB step. A relationship between SNR and PHY data rate can be established. This relationship can allow for appropriate SNR values to be calculated and sent back to the peer STA/AP for given PHY data rates.

According to the Shannon capacity equation, a direct relationship between SNR and PHY data rate can be established, i.e. a particular SNR can provide a maximum theoretical data rate. Using the Shannon capacity equation with back-off (adjustment to reflect realistic FEC coding) and a given transmission format defined in the PHY specification, the data rate vs. SNR relationship can be estimated using the following equation:

$$T=11.7 \cdot \log_2(1+10^{0.088 \cdot \gamma})-14.74, \text{ where } \gamma \text{ is the SNR in dB and } T \text{ is the transmission rate in Mbps.}$$

Alternatively, the data rate versus SNR relationship can be linearised to provide a simpler way to estimate the SNR value to correspond to a target incoming throughput. The linearised equation is as follows:

$$T=3.16 \cdot \gamma - 9.59, \text{ where } \gamma \text{ is the SNR in dB and } T \text{ is the transmission rate in Mbps.}$$

FIG. 1 shows a graph of the PHY data rate verses the SNR relationship based on both Shannon-capacity (denoted as Back-offed Shannon-Capacity) and linearised (Linear fitted) equations. The measured PHY data rate against SNR is also shown in FIG. 1. The measurement result is included in the following table. As shown in the table, values for the signal to noise ratio can be mapped on to values for the data transmission rate. The traces on the graph show that both schemes (Shannon-capacity and linearised) accurately estimate the measured data rate based on SNR. Thus it is possible to utilise the SNR feedback to provide a rate adaptation mechanism.

| | SNR | | | | | | | |
|---|---|---|---|---|---|---|---|---|
| | 4.25 | 6.75 | 8.75 | 11.75 | 14.25 | 18.25 | 19.75 | 21 |
| Rate (Mbps) | 5.85 | 11.7 | 17.55 | 23.40 | 35.1 | 46.8 | 52.65 | 58.5 |

One way to implement this mechanism is that, when a buffer overflow condition is measured or predicted by a STA receiving data from an AP, the STA can determine an appropriate SNR value that imitates degraded radio conditions (e.g. as if there was interference on the communications link) and send the determined SNR value to the AP as part of the CSI report. This causes the AP to behave as if the radio conditions were degraded, which causes the AP to reduce its data transmission rate (in accordance with its communications protocol, for example, IEEE 802.11n). In other words, the AP behaves or functions as if the capability of the STA to receive data on the communications link is reduced and thus reduces its data transmission rate. This helps to prevent the loss of data as the incoming data rate at the buffer is reduced, thus reducing the possibility of buffer overflow. Similarly, the STA may also imitate enhanced radio conditions when there is buffer underflow to increase the rate of flow of data from the AP. Thus, even if the actual radio conditions have not changed, by imitating a change in the radio conditions (e.g. degraded or enhanced radio conditions) the STA can control or induce a change in the rate of flow of data from the AP. Thus, a receiving device can be capable of generating information such that imitating a reduction in the SNR induces a reduction in the data transmission rate of a transmitting device and imitating an increase in the SNR induces an increase in the data transmission rate of a transmitting device.

Another feedback mechanism that can be utilised is the Modulation and Coding Scheme (MCS) Feedback and antenna selection command/data (MFB/ASELC) sub-field contained in the high throughput (HT) control field (defined in IEEE 802.11n-2009 7.1.3.5a and IEEE 802.11-10/1361r3 for 11ac). The HT control field can be present in a control wrapper frame and in Quality of service (QoS) Data and management frames. The MFB is a 7 bit field, which contains the maximum MCS a STA/AP can support. The MCS feedback part of the HT control field may not have been intended for flow control, but by imitating a change in the MCS it is possible to provide flow control. Thus a device can mimic the properties or capabilities of another device to provide flow control.

For single stream modulations with 20 MHz channel bandwidth and normal guard interval, the following table shows the PHY data rate versus MCS index. The indices 8 and 9 in the table are extensions according to the 802.11ac PHY draft specification (table 22-25 in IEEE 802.11-10/1361r3) for the same bandwidth option. The table can be further extended to support multiple spatial stream cases and other channel bandwidths. Using this table, it is possible to calculate the MCS index to achieve a target PHY data rate. As shown in the table, values for the modulation and coding index can be mapped on to values for the data transmission rate. The MFB feedback mechanism can provide a more explicit flow control than the SNR feedback.

tating an increase in the MCS induces an increase in the data transmission rate of a transmitting device.

The rate at which data is transmitted by a transmitting device can be based on the modulation and coding index or signal to noise ratio. Utilising either the SNR or MCS feedback, an appropriate feedback value can be calculated to set the PHY data rate as the target value. Such open-loop flow control may rely on an assumption that the feedback value to data rate relationship is known and that the peer STA/AP will respond to the feedback on the same basis. An alternative method that can be utilised is a close-loop control scheme, i.e. increasing the feedback SNR or MCS when the receiver desires a higher data rate from the transmitter and reducing the feedback SNR or MCS when the receiver desires a lower data rate from the transmitter. This alternative can be more practical in providing compatibility between devices from different vendors, where the transmitter's selection of a TX data rate based on feedback MCS or SNR may not be exactly known by the receiver.

Figure 2:
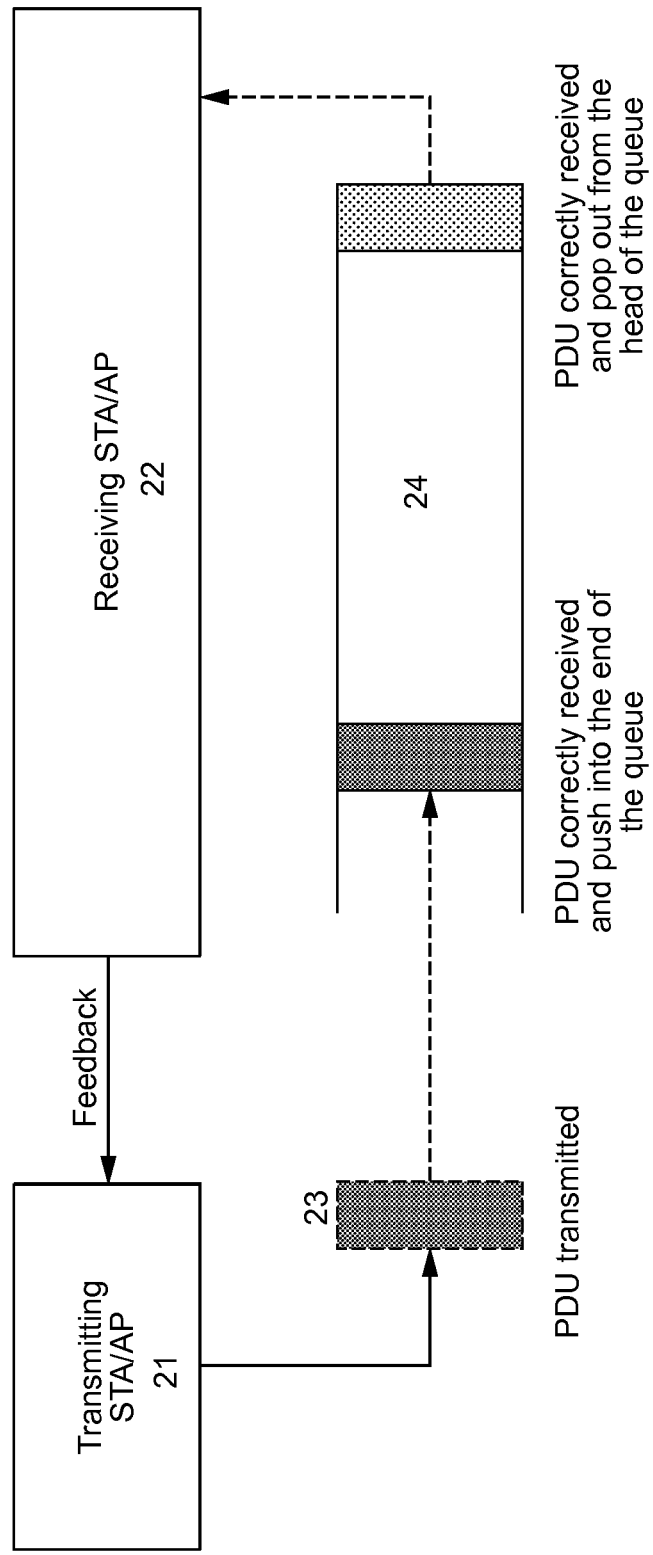
FIG. 2 shows the interaction between a transmitting communications device and a receiving communications device.

FIG. 2 illustrates an example of an interaction between a transmitting STA/AP (TX-STA) 21 and a receiving STA/AP (RX-STA) 22 in a close-loop control scheme. The TX-STA 21 sends a protocol data unit (PDU) 23 with a certain rate (defined as TX data rate) and responds to the feedback from RX-STA 22 by adjusting the MCS used in the transmission (which leads to an adjustment of the TX data rate). For simplicity, it is assumed that the RX-STA 22 correctly receives every PDU and delivers it to a queue (i.e. a buffer) 24 with limited size, in terms of number of PDUs and memory size. The RX-STA 22 processes the PDU 23 from the head of the queue 24 with a certain rate (defined as host throughput). When the queue 24 is full, no PDU can be added into the

| MCS Index | | | | | | | | | | |
|---|---|---|---|---|---|---|---|---|---|---|
| | 0 | 1 | 2 | 3 | 4 | 5 | 6 | 7 | 8 | 9 |
| Rate (Mbps) | 6.5 | 13.0 | 19.5 | 26.0 | 39.0 | 52.0 | 58.5 | 65.0 | 78.0 | 86.7 |

For example, when a buffer overflow condition is measured or predicted in a STA receiving data from an AP, the STA can determine an appropriate MCS value that imitates a reduction in the MCS that the receiving device can support and send the determined MCS value to the AP as part of the HT control field. This leads the AP to behave as if the modulation and/or coding and/or number of spatial channels supported by the STA had changed, which causes the AP to change its data transmission rate (in accordance with its communications protocol, for example, IEEE 802.11n). In other words, the AP can function as if the capability or capacity of the STA to receive data is reduced and thus reduces its data transmission rate. This helps to prevent the loss of data as the incoming data rate at the buffer is reduced, thus reducing the possibility of buffer overflow. Similarly, the STA may also imitate enhanced MCS capability when there is buffer underflow, to increase the rate of flow of data from the AP. Thus, even if the actual MCS capability of the STA has not changed, by imitating a change in the MCS supported the STA can control or induce a change in the rate of flow of data from the AP. Thus, information based on a modulation and/or coding capability of the communication device can be used to imitate a change in the capability of the device to receive data. The communication device can be capable of generating information such that imitating a reduction in the MCS induces a reduction in the data transmission rate of a transmitting device and imiqueue 24. The RX-STA 22 can monitor the flow of data, for example, by measuring the received PDU size and the transmission interval and can predict potential queue overflow by comparing the TX data rate and host throughput. Once a certain level of mismatch between TX data rate and host throughput is detected, the RX-STA 22 can send MCS feedback (for example, increasing or decreasing the MCS by one) to control the TX data rate. When the TX-STA 21 receives a new MCS feedback, it can use that MCS starting with the next transmission.

In this example, MCS feedback is utilised. However, MCS feedback can be equivalent to SNR feedback. For example, for a TX-STA that uses a link adaptation rule for selecting MCSs, an SNR to MCS mapping that is known to the RX-STA can be used.

The flow of data via the buffer can be determined by the RX-STA. This can help determine the capacity of the buffer to accommodate data received over the communications link, from which flow control can be implemented by generating and sending the appropriate information (e.g. a value of SNR or MCS). Thus the condition or state of the buffer can be determined for implementing flow control. The queue (or buffer) flow conditions can be predicted, as described in the above example. The data transmission rate of the TX-STA and the host throughput (i.e. the output data rate from the buffer, which may, for example, be determined by the rate at which the TX-STA can process data) may be known by the RX-STA. The RX-STA is capable of comparing the data transmission rate and the host throughput to determine the flow condition of the buffer. For example, if the data transmission rate is greater than the host throughput, then the RX-STA may be able to determine that the buffer queue is increasing, which can lead to buffer overflow, and thus it may send appropriate feedback to the TX-STA to reduce the data transmission rate. The rate at which the TX-STA transmits data may be different to the input data rate received at the buffer due to, for example, interference on the communications link. Thus the RX-STA may determine (by measurement, for example) the input data rate at the buffer and compare it with the output data rate to determine the flow condition of the buffer, as described above. Additionally or alternatively, the RX-STA may determine the available space in the buffer. This can be done, for example, by measuring the amount of space in the buffer or, if the buffer size is known, by measuring the amount of data in the buffer. If the buffer size is known, the available space can be determined by measuring the input data rate and the output data rate from when the buffer starts receiving data. Determining or measuring the space in the buffer or comparing the data flow rates are methods that can be used to determine the capacity of the buffer to accommodate data received over a communications link. Determining the capacity of the buffer to accommodate data received over a communications link includes comparing the transmitted data rate or the input data rate and the host throughput (i.e. the output data rate) to help predict potential buffer overflow or underflow. The appropriate information (e.g. a value of SNR or MCS) can be calculated or generated in response to the capacity of the buffer to accommodate data to implement flow control. For example, the buffer may have an increased capacity to accommodate data when the rate at which data is output from the buffer is greater than at which it is input at the buffer.

The information (e.g. a value of SNR or MCS) can imitate a change in the capability of the RX-STA to receive data via the communications link. The information can be a value that indicates a capability or capacity of the RX-STA and/or the communications link. The information can be generated by the RX-STA. The generated information can be sent to the TX-STA. The information may be generated once and sent once to imitate a change in the capability of the RX-STA to receive data via the communications link. Imitating a change in the capability of the RX-STA to receive data via the communications link can be achieved by sending the information once. The information may be sent in single data packet. For example, the information may be a SNR value that imitates a change in condition of the communications link (for example, degradation in the radio conditions). A single data packet comprising the SNR value can imitate a change in the capability of the RX-STA to receive data via the communications link. This allows the TX-STA to change its data transmission rate quickly and efficiently as the RX-STA is not required to send the information a multiple number of times to imitate a change in the capability of the RX-STA to receive data via the communications link. Also, the RX-STA may not have to send the information a multiple number of times at a certain rate to imitate a change in the capability of the RX-STA to receive data via the communications link. Thus, the change in the capability of the RX-STA to receive data via the communications link can be known by the TX-STA as soon as it receives the information, rather than the TX-STA having to wait for multiple messages from the RX-STA to determine a change in the capability. The RX-STA and the TX-STA may operate according to a standardised protocol. The information may imitate a change in the capability of the RX-STA to receive data via the communications link by virtue of it being formatted in such a way as to represent an information field that is designated in the protocol to represent an indication of the capability or capacity of the RX-STA and/or the communications link. Preferably, the information imitates a net capability or capacity of the RX-STA and/or the communications link over time as opposed to an instantaneous capability or capacity in respect of a single message unit. The information may indicate capability or capacity through the transmission of a single message. Preferably, the link additionally supports an acknowledgement protocol whereby the RX-STA can transmit acknowledgement messages to acknowledge receipt of data, such acknowledgments being distinct from the said information.

Figure 3:
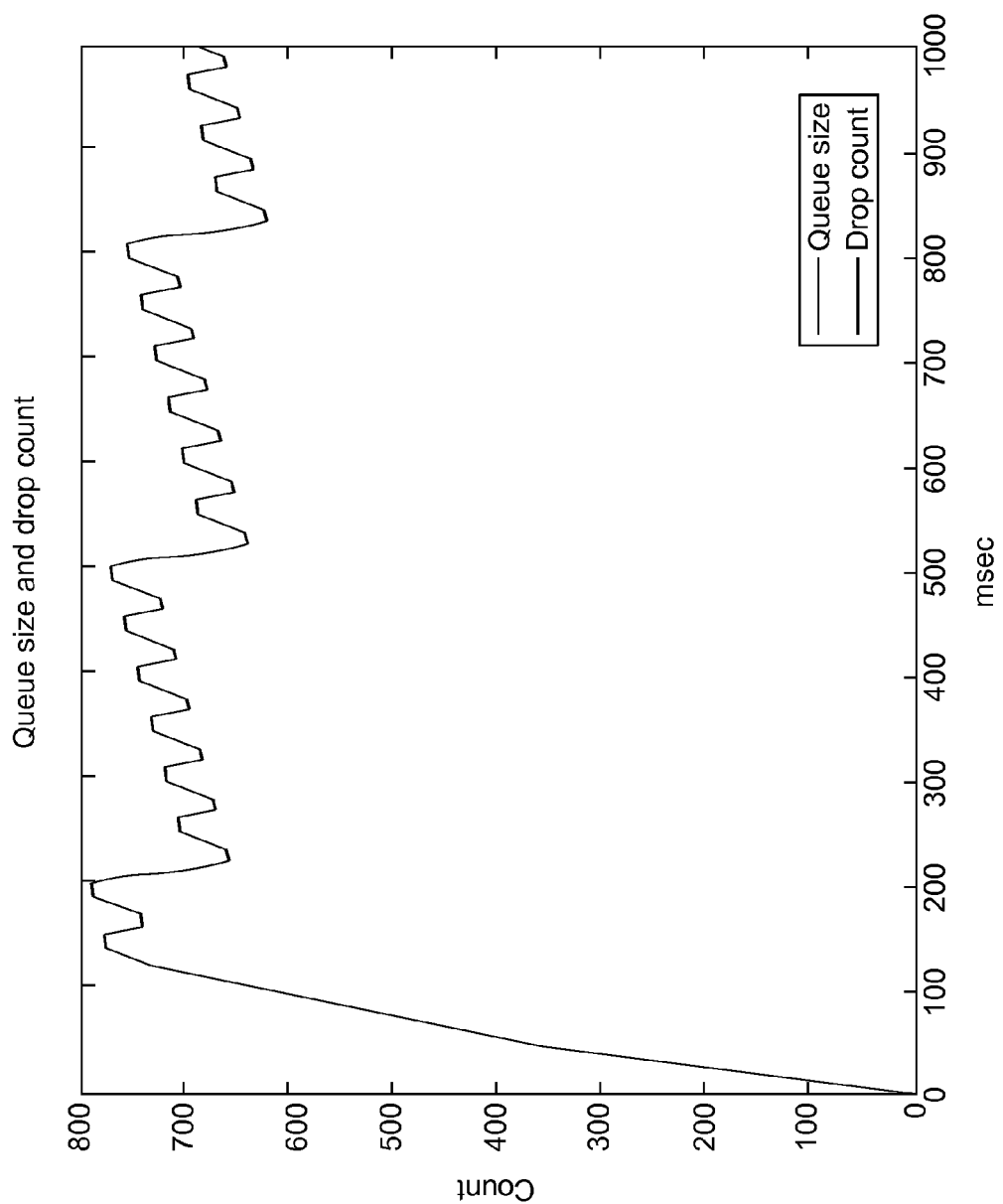
FIG. 3 shows a queue size trace.
Figure 4:
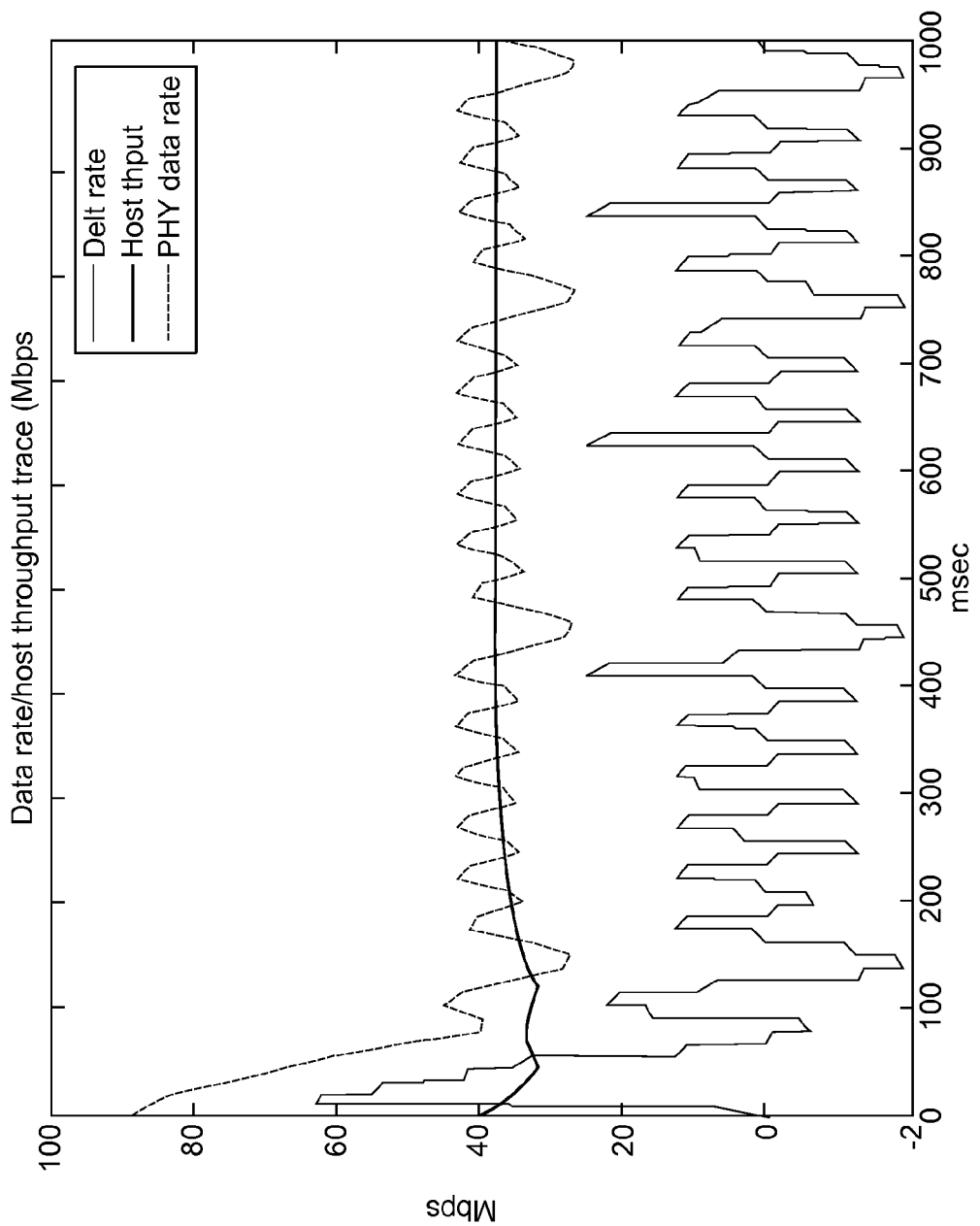
FIG. 4 shows traces of TX data rate, host throughput and the difference in the rates.
Figure 5:
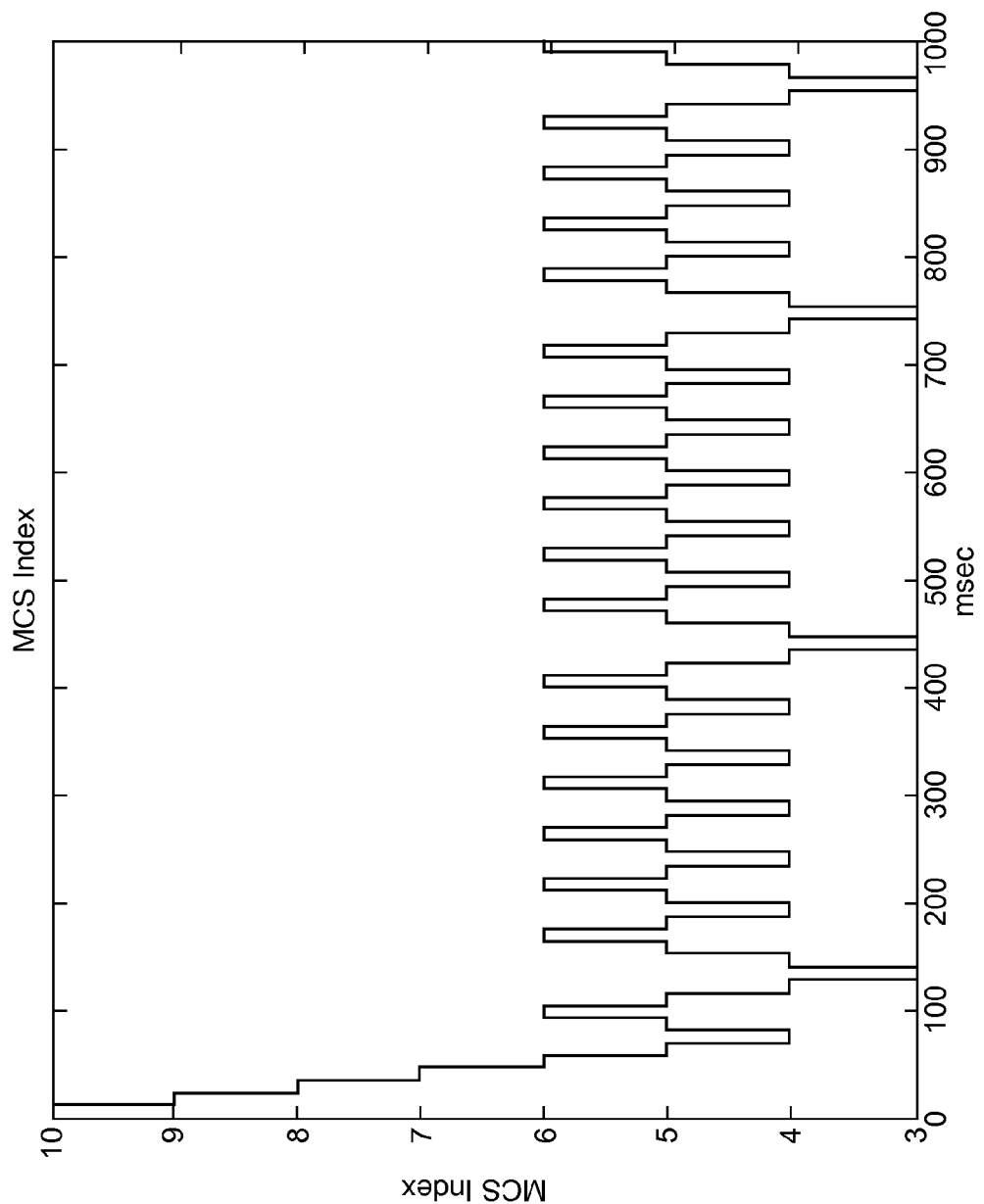
FIG. 5 shows a trace of MCS feedback.

In an example, traces to show the effects of feedback for a simulated interaction between a TX-STA and a RX-STA using the close-loop MCS feedback scheme are shown in FIGS. 3, 4 and 5. FIG. 3 shows a trace of the queue status (queue size), FIG. 4 shows the instantaneous TX data rate and host throughput and FIG. 5 shows the MCS feedback.

From the traces in FIGS. 3, 4 and 5, it can be seen that flow control is taking effect. The initial MCS is set to maximum supported value to give a maximum TX data rate and the host throughput is 40 Mbps. The initial TX/RX data rate difference causes the queue to build up. When the mismatch is detected, the RX-STA reduces the MCS index by one step at a time until the TX data rate-host throughput is matched. To maximize the PHY data rate, the RX-STA increases the MCS by one step at a time when it detects that the TX data rate is below the host throughput. When the flow control becomes stable, an oscillation of MCS feedback is noticed as the quantisation of MCS may be too coarse to avoid the mismatch between instantaneous TX data rate and host throughput.

Using link adaptation feedback, flow control can be performed in a more elegant manner and achieve increment and decrement adjustment of the PHY data rate. Compared to frame dropping or other methods, the feedback scheme is more proactive and has better quantitative control. Combined with an over-flow prediction method, with high probability, unnecessary re-transmissions and buffer overflow can be avoided. Moreover, the feedback based flow control can help avoid an under-flow condition.

Figure 6:
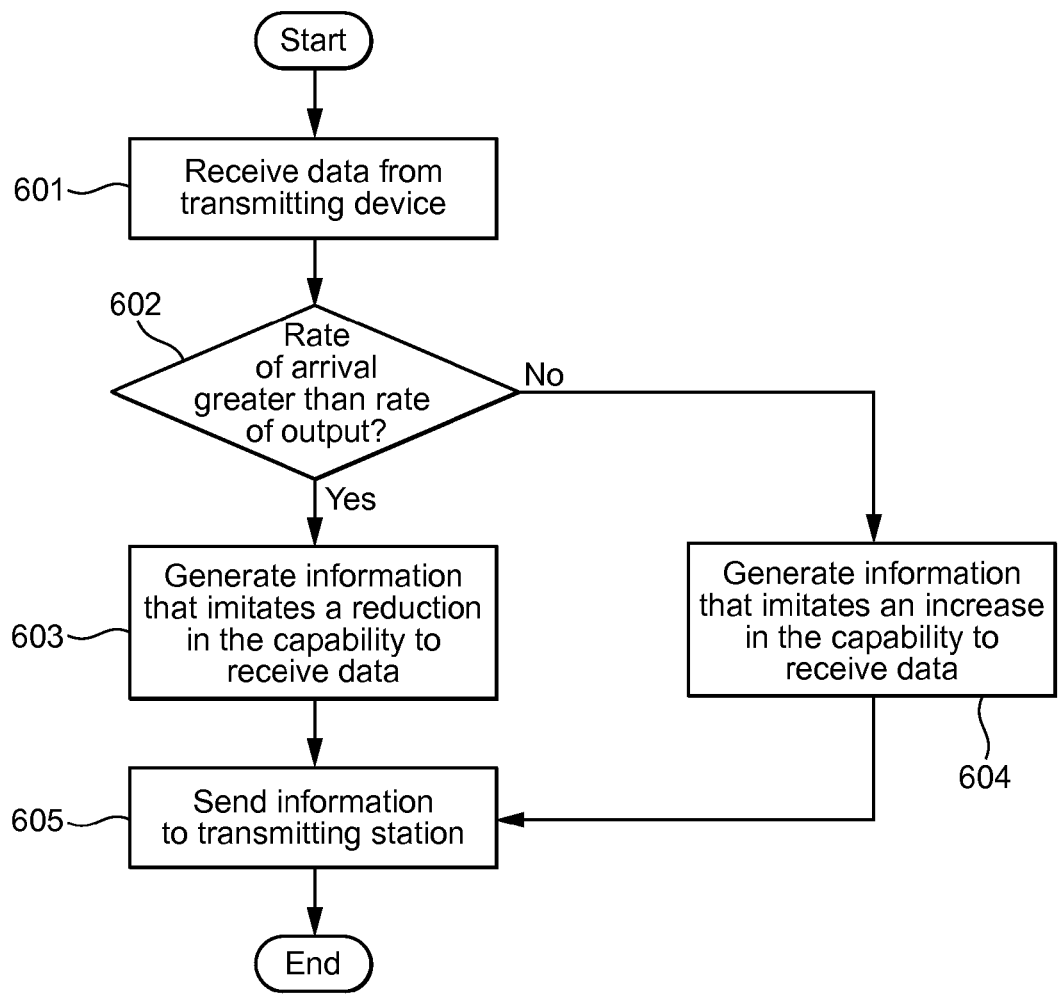
FIG. 6 shows an example of a process for implementing data flow control.

FIG. 6 diagrammatically shows an exemplary process in which a receiving device (such as a STN or AP) can provide a flow control mechanism.

At step 601, the receiving device receives data from a transmitting device. The data can be received at a buffer and is queued to be processed by a processor. The rate at which the data is received at the buffer (i.e. the input data rate) can be determined. The capacity of the buffer to receive or accommodate data can be determined by comparing the input data rate with the rate at which the processor processes the queued data (i.e. the output data rate or host throughput). The capacity of the buffer to receive or accommodate data can be determined by other methods, for example by determining the available buffer space.

At step 602, the capacity of the buffer to accommodate data is determined by comparing the input data rate and the output data rate. The capacity of the buffer to accommodate data can be determined by other methods as described above. If the input data rate is greater than the output data rate, the process moves on to step 603. If the input data rate is less than the output data rate, the process moves on to step 604.

At step 603, information that imitates a reduction in the capability of the receiving device to receive data via a communications link is generated. This can help avoid loss of data due to a full buffer. At step 604, information that imitates an increase in the capability of the receiving device to receive data via a communications link is generated. This can help optimise the rate at which data is sent and received. The information generated can be an imitated change in the MCS or SNR value as described above. The process then moves on to step 605, from step 603 or 604.

At step 605, the imitated information can be sent to the transmitting device in the next scheduled transmission, which may depend on the type of information generated and the communications protocol. The transmitting device may then change or adjust its data transmission rate in accordance with the information received from the receiving device. The transmitting device may then maintain the changed or adjusted its data transmission rate until further such information is received.

The process may be repeated periodically, on a continuous basis, in response to changes in the buffer condition or in response to changes in the wireless network. The process can help negate buffer overflow or underflow caused by factors which cause a change in the PHY data rate or a change in the host throughput. For example, a mobile receiving device may move into a line-of-sight position or a closer position with respect to the transmitting device. This can lead to an increase in the PHY data rate, which may be greater than the host throughput. The receiving device can help prevent buffer overflow (which can cause a loss in data) by implementing the above process. In another example, the host throughput may increase (for example, due to a fewer applications using the processor, leading to a greater availability of the processor), which may cause buffer underflow. The receiving device can help prevent buffer underflow (which would be an inefficient use of resources) by implementing the above process.

Figure 7:
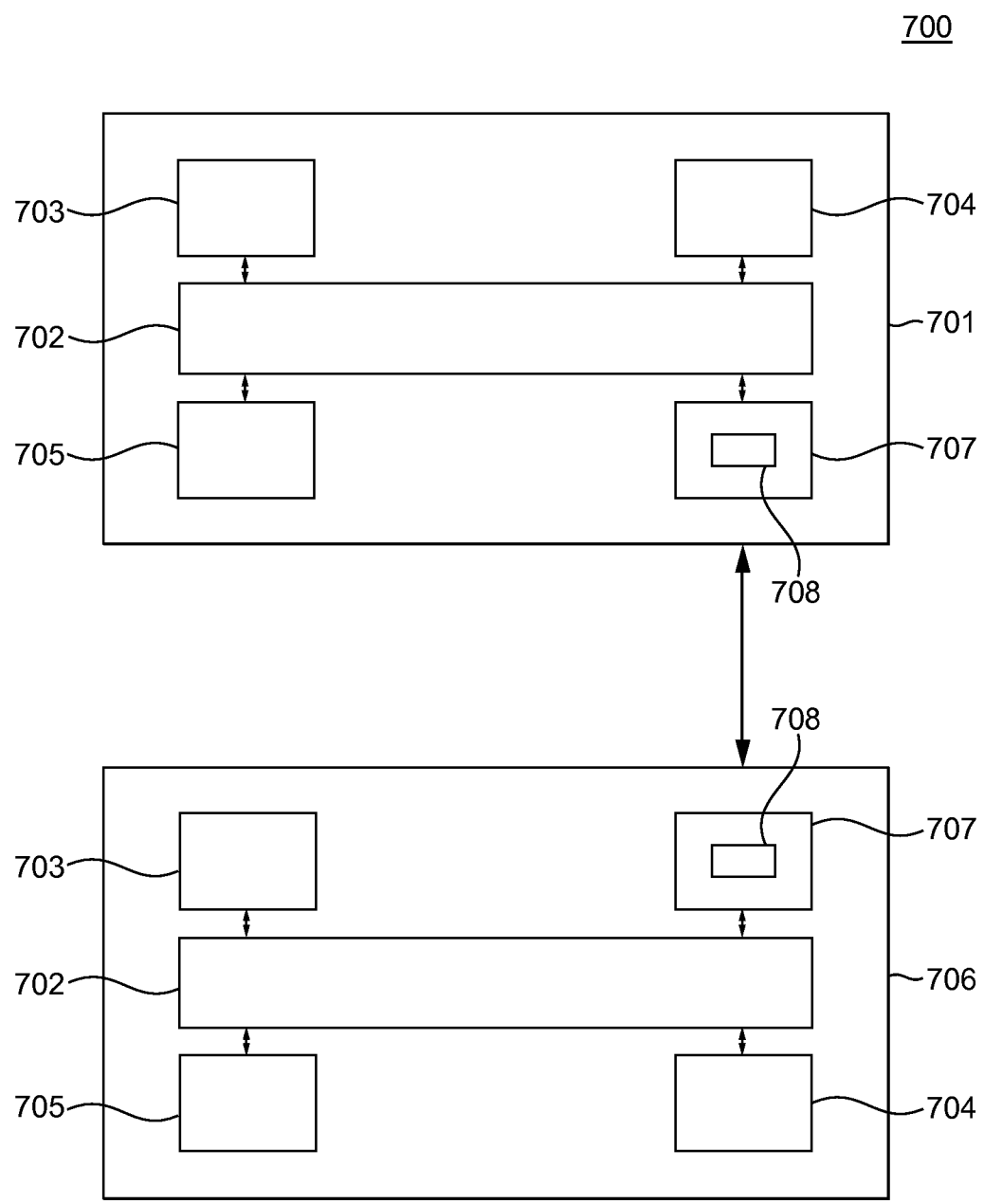
FIG. 7 shows an example of a wireless network.

FIG. 7 is a block diagram that depicts a wireless network 700. The wireless network 700 comprises a computer system, such as a receiving device 701 upon which an embodiment of the invention may be implemented. Receiving device 701 includes a bus 702 or any other communication mechanism for communicating information, and a processor 703 coupled with bus 702 for processing information. Receiving device 701 also includes a memory 704, such as a random access memory (RAM) or other dynamic storage device, coupled to bus 702 for storing information and instructions to be executed by processor 703. Memory 704 also may be used for storing temporary variables or other intermediate information during execution of instructions to be executed by processor 703. Memory 704 may further include a read only memory (ROM) or other static storage device for storing static information and instructions for processor 703. A storage device 705, such as a non-volatile storage chip, magnetic disk or optical disk, can be provided and coupled to bus 702 for storing information and instructions. A transmitting device 706 with similar features to the receiving device 701 can also be provided in the network 700.

The invention can be related to the use of the receiving device 701 and/or the transmitting device 706 for implementing the techniques described herein. According to one embodiment of the invention, those techniques are performed by receiving device 701 in response to processor 703 executing one or more sequences of one or more instructions contained in memory 704. Such instructions may be read into memory 704 from another computer-readable medium, such as storage device 705. Execution of the sequences of instructions contained in memory 704 causes processor 703 to perform the process steps described herein. In alternative embodiments, hard-wired circuitry may be used in place of or in combination with software instructions to implement the invention. Thus, embodiments of the invention are not limited to any specific combination of hardware circuitry and software.

Receiving device 701 and transmitting device 706 also includes a wireless communication interface 707 coupled to bus 702. Wireless communication interface 707 provides a two-way data communication coupling between the receiving device 701 and transmitting device 706 (and any other devices that may be part of the wireless network 700). Receiving device 701 and transmitting device 706 can send/receive code or data to each other via a wireless communication interface 207 (which provides access to a wireless communications link or medium). The receiving device 701 and transmitting device 706 may communicate wirelessly using a wireless protocol such as IEEE 802.11.

The wireless communication interface 707 of the receiving device 701 and transmitting device 706 can comprise a buffer 708. The received data or code can be received at the input of the buffer. The output of the buffer may be coupled to the processor 703 via a bus 702. The processor 703 may process data that is output from the buffer 708.

In one example, the processor 703 of the receiving device 701 may determine the rate at which it processes data from the output of buffer 708 and compare the output rate to the rate at which data is received at the input of the buffer 708 to analyse the condition or capacity of the buffer. From the comparison, the processor may generate and send instructions to the wireless communication interface 707 of the receiving device 701 to send information that imitates a change in the capability of the receiving device 701 to receive data. This information is then sent to the transmitting device 706 via the wireless communications link. The transmitting device 706 then processes this information at its processor 703 and then, based on the information, sends instructions to its wireless communications interface 707 to adjust its data transmission rate accordingly.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems discloses herein, and without limitation to the scope of the claims. The applicants indicate that aspects of the present invention may consist of any such feature or combination of features. In view of the foregoing description it will be evident to a person skilled in the art that various modifications may be made within the scope of the invention.

The invention claimed is:

1. A communication device configured to receive data from a transmitting device via a communications link, wherein the communication device is configured to operate in accordance with a radio protocol or a link layer protocol, the communication device comprising a buffer configured to generate, in dependence on a capacity of the buffer to accommodate data received over the communications link, information for inducing the transmitting device to change its data transmission rate, wherein:

the information imitates a change in a capability of the communication device to receive data via the communications link;

the information controls communication between the communication device and the transmitting device in accordance with the radio or link layer protocol; and in accordance with the protocol, the information comprises a signal to noise ratio (SNR) value configured for controlling beamforming, but is used instead to implement flow control.

2. The communication device according to claim 1, wherein the information is such as to control communication between the communication device and the transmitting device in accordance with a link layer protocol.

3. The communication device according to claim 1, wherein the information is dependent on a modulation and/or coding capability of the communication device.

4. The communication device according to claim 1, wherein the information is dependent on a modulation and/or coding scheme.

5. The communication device according to claim 4, wherein the change in the capability comprises increasing or decreasing the modulation and/or coding scheme.

6. The communication device according to claim 1, wherein the information is dependent on a performance of the communication device and/or the communications link.

7. The communication device according to claim 1, wherein the change in the capability comprises increasing or decreasing an indication of the signal to noise ratio.

8. The communication device according to claim 1, wherein the capacity of the buffer to accommodate data received over the communications link is dependent on one or more of:
   data transmission rate of the transmitting device;
   input data rate at the buffer;
   output data rare at the buffer; and
   available space in the buffer.

9. The communication device according to claim 1, wherein the capacity of the buffer to accommodate data received over the communications link is determined in dependence of predicting buffer overflow or underflow.

10. The communication device according to claim 1, wherein the capacity of the buffer to accommodate data received over the communications link is determined in dependence of comparing the data transmission rate and an output data rate to determine available buffer space.

11. The communication device according to claim 10, wherein the communication device is configured such that:
   when the data transmission rate is greater than the output data rate, the information imitates a change in a capability of the communication device to induce a reduction in the data transmission rate; and
   when the data transmission rate is less than the output data rate, the information imitates a change in a capability of the communication device to induce an increase in the data transmission rate.

12. The communication device according to claim 1, wherein the communication device is configured to send the information to the transmitting device.

13. The communication device according to claim 1, wherein the communications link is wireless.

14. A method of operating a receiver, wherein the receiver is configured to operate in accordance with a radio protocol or a link layer protocol, the receiver comprising a buffer, the method comprising:
   receiving data from a transmitting device via a communications link;
   generating information in dependence on the capacity of the buffer to accommodate data received over the communications link,
   wherein the information imitates a change in a capability of the receiver to receive data via the communications link; and
   sending the information to the transmitting device, wherein:
   the information induces the transmitting device to change its data transmission rate;
   the information controls communication between the receiver and the transmitting device in accordance with the radio or link layer protocol; and
   in accordance with the protocol, the information comprises a signal to noise ratio (SNR) value configured for controlling beamforming, but is used instead to implement flow control.

15. A non-transitory computer readable medium for operating a receiver of a communication device that includes a processor, wherein the receiver is configured to operate in accordance with a radio protocol or a link layer protocol, the non-transitory computer readable medium including instructions that, when executed by the processor performs a method comprising:
   receiving data from a transmitting device via a communications link;
   generating information in dependence on the capacity of a buffer of the receiver to accommodate data received over the communications link,
   wherein the information imitates a change in a capability of the receiver to receive data via the communications link; and
   sending the information to the transmitting device, wherein:
   the information induces the transmitting device to change its data transmission rate;
   the information controls communication between the receiver and the transmitting device in accordance with the radio or link layer protocol; and
   in accordance with the protocol, the information comprises a signal to noise ratio (SNR) value configured for controlling beamforming, but is used instead to implement flow control.

* * * * *